Nov. 18, 1941.  W. M. ANDERSON  2,263,345
TIRE VALVE BENDING TOOL
Filed March 7, 1940  2 Sheets-Sheet 1
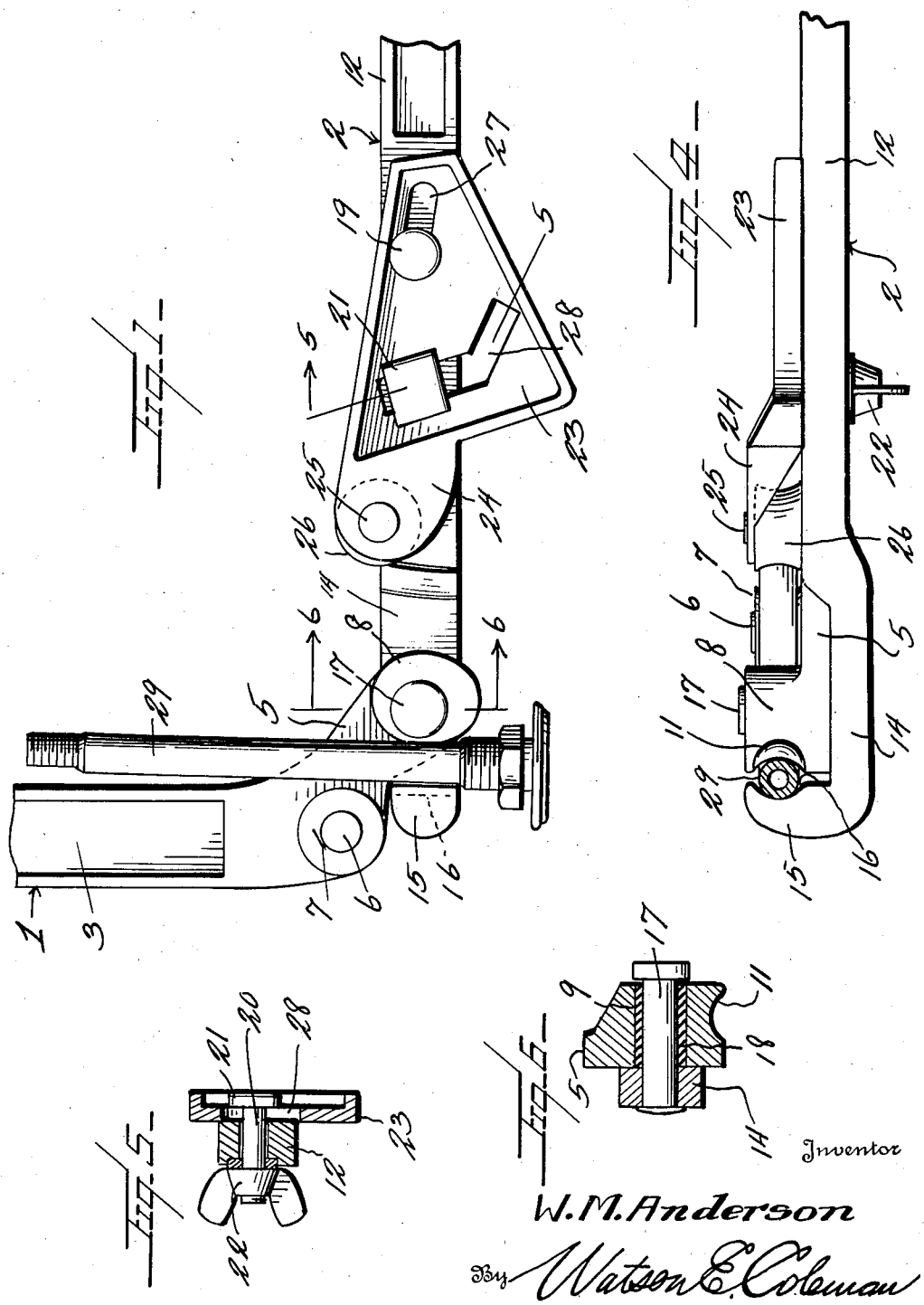
Inventor
W. M. Anderson
By Watson E. Coleman
Attorney

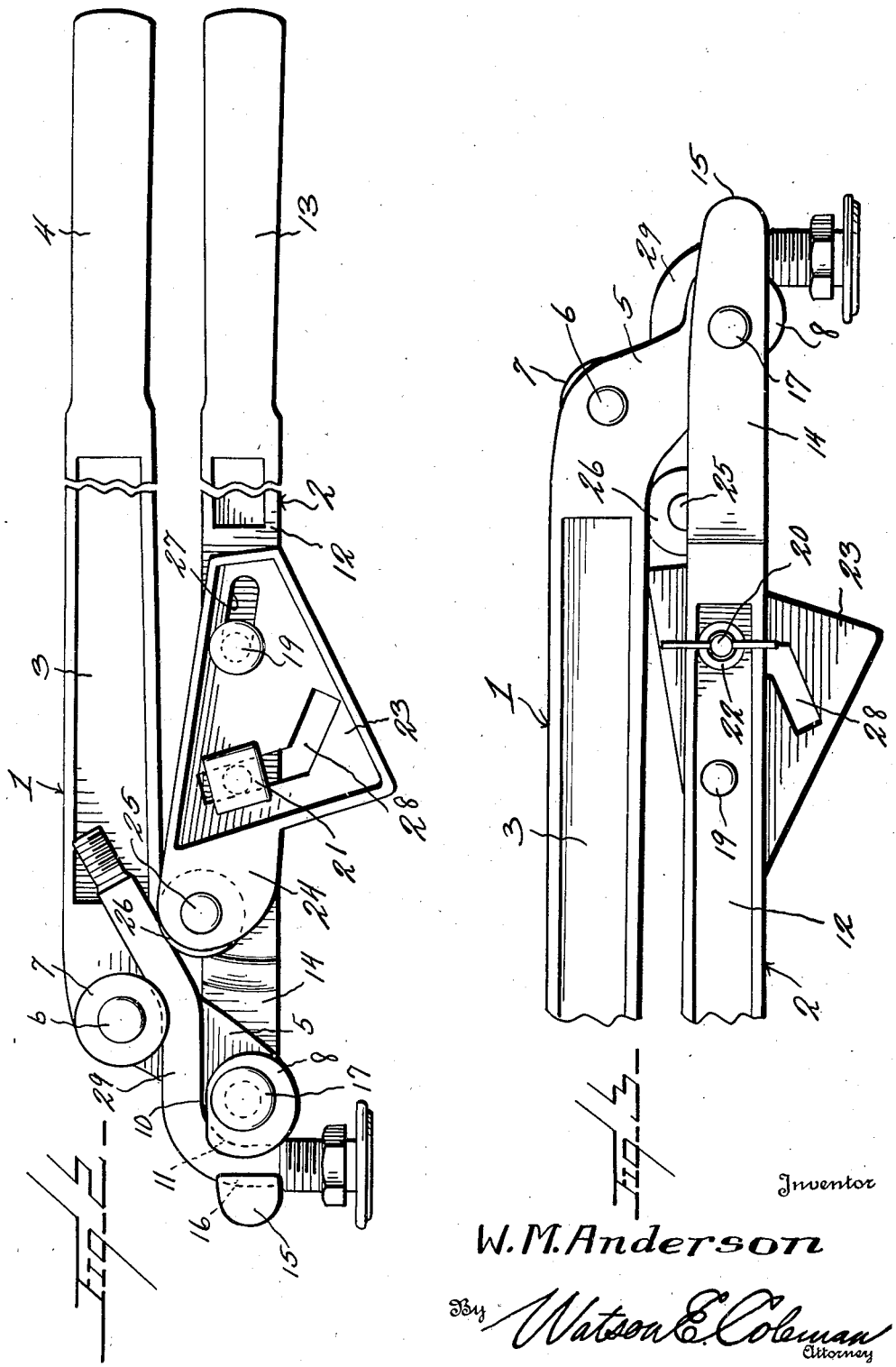

Patented Nov. 18, 1941

2,263,345

UNITED STATES PATENT OFFICE 2,263,345

TIRE VALVE BENDING TOOL

William M. Anderson, Virginia, Minn.

Application March 7, 1940, Serial No. 322,836

14 Claims. (Cl. 81—15)

This invention relates generally to the class of tools and pertains particularly to a tool for bending tubular bodies, more especially pneumatic tire valve rims.

The present invention has for its primary object to provide a valve stem bending tool which is so designed that desired bends may be made in a valve stem easily and quickly without danger of marring or crushing the stem so as to impair its usefulness.

Another object of the invention is to provide a valve stem bending tool which is hand operated and which has an adjustable jaw or anvil by means of which various degrees of bending may be imparted to the outer end of a valve stem as may be required to adjust the stem in the most convenient position with respect to a tire supporting wheel felly.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in elevation of the tool embodying the present invention, portions of each handle being broken off, showing the tool opened to receive a straight stem for bending.

Fig. 2 is a view in side elevation of the tool in closed position, showing the manner in which the stem is given a right angle and an obtuse angle.

Fig. 3 is a view of the head end of the tool from the opposite side from that shown in Fig. 2, this figure being a view of the rear side of the tool.

Fig. 4 is an edge view of the tool, the stem being in section.

Fig. 5 is a sectional view on the line 5—5 of Fig. 1.

Fig. 6 is a sectional view on the line 6—6 of Fig. 1.

Referring now more particularly to the drawings, it will be seen that the present tool consists of two main parts 1 and 2, which are moved relatively to one another in the employment of the tool. The part 1 comprises a shank 3 formed at one end into a handle 4 while at its forward or head end, the shank merges into an oblique extension 5. At the point of the angle between the extension 5 and the shank 3 and adjacent the outside thereof, there is fixed a pin 6 which projects from one side face of the shank and passes through or supports a grooved roller 7. At its free end the extension 5 merges with a head 8 which extends forwardly from the face of the extension and has an aperture as shown in Fig. 6, to facilitate the attachment of this end of the extension with the other portion of the tool in the manner hereinafter stated. The side face of the head 8 nearest the roller 7, is flattened slightly, as indicated at 10, and the forward side of the head which is the side directed longitudinally of and away from the shank 3, is provided with a stem receiving groove 11. The portion 2 like the portion 1 also consists of a relatively long straight member which has a shank 12 formed at one end to provide a handle 13 while at its forward or head end, the shank is shaped to provide the rearwardly offset longitudinal continuation or extension 14 which terminates in the forwardly and rearwardly turned hook 15. This hook is shaped by the provision in its working face of the transverse channel or recess 16, which receives a portion of the valve stem which is to be bent, and this channel cooperates with the channel 11 in the head 8 to hold a stem adjacent its head end, firmly in position.

Secured to the front side of the extension 14 is a pivot post 17 about which is a sleeve 18 of a yieldable or resilient material, such as rubber or rubber composition of a suitable character. This post and sleeve extend through the opening 9 of the head 8 so that the latter turns about the post 17, which forms a fulcrum and pivotal center for the elongated portion 1.

The oblique extension 5 of the portion 1 is disposed against the front face of the portion 14, as shown in Fig. 4, so that the two handles may be brought into parallel relation in a common plane.

The shank 12 carries upon its front side a fixed stud 19 and forwardly from this stud, a suitable opening is formed through the shank for the reception of a wing nut screw 20, the head of the screw being indicated at 21 and being disposed upon the front side of the tool, while upon the opposite side or rear side of the tool, a wing nut 22 is threaded on the screw. This stud 19 and screw 20 cooperate to secure on the front side of the shank 12, a plate 23, the length of which is disposed lengthwise of the shank and the forward end of which is formed to provide a longitudinally extending wing 24, which is held by the plate in spaced parallel relation with the adjacent front side of the shank 12. This wing carries a pivot pin 25 on which is supported, between the wing and the adjacent front side of the shank 12, a peripherally grooved anvil roller 26.

Adjacent the end of the plate 23 which is remote from the roller 26, the plate is provided with a longitudinal slot 27 through which the stud 19 extends whereby limited longitudinal movement of the plate on the shank 12 is permitted and adjacent its forward end, between the longitudinal slot 27 and the roller 26, the plate 23 is provided with the obtusely angled slot 28, one arm of which intersects the line of the slot 27 while the other arm extends away from the roller carrying end of the plate and laterally from the line of the slot 27. Through this obtusely angled slot 28, the screw 20 passes, the head 21 engaging the forward or front side of the plate, as shown, and functioning to clamp the plate in fixed position when the wing nut 22 is drawn up tight against the shank 12. By the provision of the straight slot 27 and the angled slot 28 in the plate 23 which carries the roller 26, it will be apparent that the plate may be shifted so as to swing the adjustable or movable roller 26 from a position directly in front of the shank 12, in an arc transversely of the shank and towards the shank 3 of the other movable portion or handle of the tool and also the plate can be shifted longitudinally so as to move the adjustable roller 26 toward or away from the roller 7 and the grooved head 8. In the first position of the plate where the roller 26 lies directly in front of the shank 12, it will be seen that the roller is in line longitudinally of the shank 12 with the head 8 and the hook 15, Fig. 2 of the drawings showing the roller slightly to one side of this line, but when the plate 23 is rocked on the stud 19, whether the plate be shifted lengthwise as would be the case if the screw is made to enter the arm of the angled slot 28 which is to one side of the slot 27, or not, the roller 26 will be offset from the shank 12 and may be moved over until it is substantially in line with the roller 7 longitudinally of the shank 3 or even beyond this roller from the head 8.

The numeral 29 indicates a tire valve stem, which in Fig. 1, is shown in its original straight condition. In order to give a desired bend to this stem, the two handles of the tool are swung apart until they assume a substantially right angular relation at which time the flat side of the head 8 will come into opposition with the recessed side of the hook 15, thus providing sufficient space between these members to permit the valve to be inserted, as shown in Fig. 1, where it will be disposed lengthwise of the portion 1. By then bringing the portions 1 and 2 together into the position shown in Fig. 2, the roller 7 will engage the stem and, since the head end of the stem will be firmly held in the recesses 11 and 16, which will be brought into opposed relation, bend the stem around the head 8. If the plate 23 is adjusted, as shown in Fig. 2, so as to set the anvil roller 26 slightly off from its alinement with the head 8 longitudinally of the shank 12 or, in other words, to position it on a line passing between the head 8 and roller 7 when the handles are in parallel relation, then the free end of the stem will be brought to bear against the roller 26 before the handles are in the parallel relation shown and movement of the stem will be stopped, thus causing the roller 7 to form a reverse bend in the stem to that one which is formed by the head 8. Thus the stem will have a substantially right angle or 90° bend and an oblique bend, as shown.

It will be readily apparent from the foregoing that if the roller 26 is retained in front of the shank 12 in line with the head 8, the second or oblique bend will not be formed in the stem and on the other hand, if the plate 23 is shifted farther out from the shank 12 either into alinement with or nearer to an alinement with the roller 7 longitudinally of the shank 3, a still greater second bend will be given to the stem. If, in addition to swinging the roller 26 laterally as far as it will go, the plate 23 is also shifted forwardly toward the head end of the tool so as to bring it into closer relation with the roller 6, it will be possible to make the second bend substantially a 90° bend, also thus making the extreme ones of the three sections into which the valve would be divided by such bends, substantially in parallel relation.

By the provision of the resilient sleeve 9, provision is made for a slight shifting of one of the portions with respect to the other, particularly of the head 8 with respect to the hook 15, so that all danger of mashing, crushing or marring the valve stem is avoided.

From the foregoing, it will be readily apparent that the tool herein described provides a quick and efficient means of imparting such bends to valve stems as may be required to facilitate placing such stems in a desired position with respect to a vehicle wheel rim and wheel body.

What is claimed is:

1. A tube bending tool, comprising two elongated pivotally coupled members, a pair of cooperating elements carried by said members for relative movement with the members for securing a tubular body against movement, a pressing element carried by one of said members to be moved thereby in an arcuate path relative to one of the first-mentioned elements and transversely of a tube secured between said cooperating elements to bend said tube around one of the first-mentioned elements when the members are swung into side by side relation, and a second pressing element disposed outside the arcuate path of movement of the first pressing element and supported upon the other member from the first pressing element in a position to limit the bending movement of the tube by the first pressing element whereby to impart a reverse bend to the tube.

2. A tube bending tool, comprising two elongated pivotally coupled members, a pair of cooperating elements carried by said members for relative movement with the members for securing a tubular body against movement, a pressing element carried by one of said members to be moved thereby in an arcuate path relative to one of the first-mentioned elements and transversely of a tube secured between said cooperating elements to bend said tube around one of the first-mentioned elements when the members are swung into side by side relation, and a second pressing element disposed outside the arcuate path of movement of the first pressing element in a position to limit the bending movement of the tube by the first pressing element whereby to impart a reverse bend to the tube, said second-mentioned pressing element being adjustably supported upon the said other member for movement transversely of the member and for movement toward or away from the said arcuate path of travel of the first pressing element.

3. A tube bending tool of the character described, comprising a body member, means carried by said member forming a fixed tube engaging jaw, a second and elongated member having an obliquely directed end portion, a pivotal connection between said end portion and the first member adjacent said jaw, a head carried by said oblique portion at the pivoted end for coaction with said jaw to secure an end of a tube transversely of the jaw and forming a shaper around which the tube is bent, said head turning with said oblique portion in the direction of bend of the tube, and a pressing element carried by the second member in spaced relation longitudinally of the oblique portion with said head to be swung around the rotary center of the head in an arc intersecting the tube held between said jaw and head.

4. A tube bending tool of the character described, comprising an elongated body member, means carried by said member adjacent one end forming a tube engaging jaw, the opposite end of the member constituting a handle, a second elongated member having an obliquely directed end portion, a pivotal connection between said end portion and the first member adjacent said jaw, a head carried by said oblique portion at the pivoted end for coaction with said jaw to secure an end of a tube transversely of the first member, a pressing element carried by the second member in spaced relation longitudinally of the oblique portion with said head to be swung around said pivotal connection in an arc intersecting the tube held between said jaw and head, and a tube engaging pressing element carried by the first member upon the same side as the head and jaw and positioned with respect to said pivotal connection outside the arc described by the first pressing element in its movement with the second member.

5. A tube bending tool of the character described, comprising an elongated body member, means carried by said member adjacent one end forming a tube engaging jaw, the opposite end of the member constituting a handle, a second elongated member having an obliquely directed end portion, a pivotal connection between said end portion and the first member adjacent said jaw, a head carried by said oblique portion at the pivoted end for coaction with said jaw to secure an end of a tube transversely of the first member, a pressing element carried by the second member in spaced relation longitudinally of the oblique portion with said head to be swung around said pivotal connection in an arc intersecting the tube held between said jaw and head, and a tube engaging pressing element carried by the first member upon the same side as the head and jaw and positioned with respect to said pivotal connection outside the arc described by the first pressing element in its movement with the second member, the second-mentioned pressing element being adjustable upon the first member toward and away from said pivotal connection and transversely of the first member.

6. A tube bending tool of the character described, comprising an elongated member formed at one end to provide a handle, a hook-like jaw carried by the member at its other end, a pivot pin carried by the member adjacent to the working face of said jaw, a second elongated member formed at one end to provide a handle and having a short oblique extension at its other end, a head carried upon the outer end of said extension and pivotally connected with said pin, the head having an eccentric tube engaging face in spaced relation with the working face of the jaw for coaction with the jaw to secure a tube transversely of the member, and a pressing element carried by the second member at the inner end of said oblique extension and upon the same side of the extension as the head to be swung about said pivot pin in an arc intersecting a tube held between the jaw and head, said head having a portion of one side flattened and arranged to be brought into opposed relation with said hook jaw when the members are in right angular relation to facilitate the insertion of a tube between the head and jaw, a portion of the head adjacent said flat portion being recessed to receive the tube when the head is turned upon bringing the members into parallel relation.

7. A tube bending tool of the character described, comprising an elongated member formed at one end to provide a handle, a hook-like jaw carried by the member at its other end, a pivot pin carried by the member adjacent to the working face of said jaw, a second elongated member formed at one end to provide a handle and having a short oblique extension at its other end, a head carried upon the outer end of said extension and pivotally connected with said pin, the head having an eccentric tube engaging face in spaced relation with the working face of the jaw for coaction with the jaw to secure a tube transversely of the member, a pressing element carried by the second member at the inner end of said oblique extension and upon the same side of the extension as the head to be swung about said pivot pin in an arc intersecting a tube held between the jaw and head, and yieldable means joining said head with the pivot pin whereby the head has limited movement toward and away from the adjacent jaw.

8. A tube bending tool of the character described, comprising an elongated member formed at one end to provide a handle, a hook-like jaw carried by the member at its other end, a pivot pin carried by the member adjacent to the working face of said jaw, a second elongated member formed at one end to provide a handle and having a short oblique extension at its other end, a head carried upon the outer end of said extension and pivotally connected with said pin, the head having an eccentric tube engaging face in spaced relation with the working face of the jaw for coaction with the jaw to secure a tube transversely of the member, a pressing element carried by the second member at the inner end of said oblique extension and upon the same side of the extension as the head to be swung about said pivot pin in an arc intersecting a tube held between the jaw and head, and a sleeve of yieldable material encircling said pin and interposed between the same and the head.

9. A tube bending tool of the character described, comprising an elongated member formed at one end to provide a handle, a hook-like jaw carried by the member at its other end, a pivot pin carried by the member adjacent to the working face of said jaw, a second elongated member formed at one end to provide a handle and having a short oblique extension at its other end, a head carried upon the outer end of said extension and pivotally connected with said pin, the head having a tube engaging face in spaced relation with the working face of the jaw for coaction with the jaw to secure a tube transversely of the member, a pressing element carried by the second member at the inner end of said oblique extension and upon the same side of the extension as the head to be swung about said pivot pin in an arc intersecting a tube held between the jaw and head, a body mounted upon the first member upon the same side thereof as the head, said body being joined to the supporting member to have both longitudinal and transverse movement thereon, and a presser element carried by the body and lying outside the arcuate path of movement of said first presser element around the pivot pin.

10. A tube bending tool of the character described, comprising an elongated member formed at one end to provide a handle, a hook-like jaw carried by the member at its other end, a pivot pin carried by the member adjacent to the working face of said jaw, a second elongated member formed at one end to provide a handle and having a short oblique extension at its other end, a head carried upon the outer end of said extension and pivotally connected with said pin, the head having a tube engaging face in spaced relation with the working face of the jaw for coaction with the jaw to secure a tube transversely of the member, a pressing element carried by the second member at the inner end of said oblique extension and upon the same side of the extension as the head to be swung about said pivot pin in an arc intersecting a tube held between the jaw and head, a body mounted upon the first member upon the same side thereof as the head, said body being joined to the supporting member to have both longitudinal and transverse movement thereon, and a presser element carried by the body and lying outside the arcuate path of movement of said first presser element, said presser elements consisting of peripherally grooved rollers lying in a common plane with the said head and jaw.

11. A tube bending tool of the character described, comprising an elongated member formed at one end to provide a handle, a hook-like jaw carried by the member at its other end, a pivot pin carried by the member adjacent to the working face of said jaw, a second elongated member formed at one end to provide a handle and having a short oblique extension at its other end, a head carried upon the outer end of said extension and pivotally connected with said pin, the head having a tube engaging face in spaced relation with the working face of the jaw for coaction with the jaw to secure a tube transversely of the member, a pressing element carried by the second member at the inner end of said oblique extension and upon the same side of the extension as the head to be swung about said pivot pin in an arc intersecting a tube held between the jaw and head, a body mounted upon the first member upon the same side thereof as the head, said body being joined to the supporting member to have both longitudinal and transverse movement thereon, a presser element carried by the body and lying outside the arcuate path of movement of said first presser element around the pivot pin, said body consisting of a plate lying upon the first member and having a slot extending generally longitudinally of the first member and an angled slot extending generally across the first member, a fixed pin carried by the first member and engaging in the first slot, a shiftable securing pin carried by the first member and passing through the second slot and having a head securing the plate to the adjacent member, and the said second presser element comprising a peripherally grooved roller supported by the end of the plate nearest said head and in a plane common to the first presser element, the head and jaw.

12. A tube bending tool, comprising two members one being pivotally supported upon the other, a pair of cooperating elements carried by said members between which a tube is disposed and held while being bent, said elements having opposing recessed faces and shifting relative to one another to partially encircle the tube upon turning of one member in one direction upon the other, one of said elements constituting a form about which the tube is bent, a pressing element carried by the pivoted one of the members to be swung in an arcuate path relative to the pivot between the two members and transversely of a tube secured between said cooperating elements to bend said tube around the said one of the first-mentioned elements, the said one of the first-mentioned elements around which the tube is bent being rotatable with its supporting member, and means for turning the rotatably supported element in the direction in which the tube is bent during the turning movement of the pressing element along said arcuate path.

13. A tube bending tool, comprising two members one being pivotally supported upon the other, a pair of cooperating elements carried by said members between which a tube is disposed and held while being bent, one of said elements constituting a form about which the tube is bent and turning with its supporting member, a pressing element carried by the pivoted one of the members to be swung in an arcuate path relative to the pivotal center of the said one of the cooperating elements and transversely of a tube secured between said cooperating elements to bend said tube around the said one of the first-mentioned elements, means for turning the rotatably supported element in the direction in which the tube is bent during the turning movement of the pressing element along said arcuate path, and means supported upon the said other one of the members outside the arc of movement of the pressing element for engagement by the tube to impart a reverse bend to the tube under pressure applied by the pressing element.

14. A tube bending tool, comprising two pivotally coupled members, a pair of elements carried by said members for cooperative relative movement and having recessed portions to partially encircle and secure from displacement a tubular body located between the elements, upon relative pivotal movement of the members, and a pressing element carried by one of said members to be moved thereby in an arcuate path with respect to the pivot for the members and transversely of a tube secured between said co-operating elements to bend said tube around one of the first mentioned elements, the said one of the first mentioned elements turning with its supporting member in the direction of bending of the tube as the tube is being bent around it.

WILLIAM M. ANDERSON.